United States Patent
Zupancic et al.

(10) Patent No.: US 9,701,786 B2
(45) Date of Patent: Jul. 11, 2017

(54) EPOXY-TERMINATED POLYESTER

(71) Applicant: Rohm and Haas Company, Philadelphia, PA (US)

(72) Inventors: Joseph J. Zupancic, Glen Ellyn, IL (US); Amira A. Marine, Missouri City, TX (US); David E. Vietti, Cary, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/035,782

(22) PCT Filed: Nov. 17, 2014

(86) PCT No.: PCT/US2014/065940
§ 371 (c)(1),
(2) Date: May 11, 2016

(87) PCT Pub. No.: WO2015/073965
PCT Pub. Date: May 21, 2015

(65) Prior Publication Data
US 2016/0289376 A1 Oct. 6, 2016

Related U.S. Application Data

(60) Provisional application No. 61/905,374, filed on Nov. 18, 2013.

(51) Int. Cl.
*C08G 63/91* (2006.01)
*C08G 63/672* (2006.01)

(52) U.S. Cl.
CPC ......... *C08G 63/916* (2013.01); *C08G 63/672* (2013.01)

(58) Field of Classification Search
CPC .............................. C08G 63/916; C08G 59/24
See application file for complete search history.

(56) References Cited

U.S. PATENT DOCUMENTS

| | | | |
|---|---|---|---|
| 3,395,128 A * | 7/1968 | Hale | ........ C08G 59/24 528/102 |
| 3,576,903 A | 4/1971 | Groff | |
| 3,836,485 A | 9/1974 | Shih | |
| 3,985,825 A | 10/1976 | Schmid et al. | |
| 4,952,645 A | 8/1990 | Mulhaupt et al. | |
| 6,489,405 B1 * | 12/2002 | Beisele | ........ C08G 59/12 428/413 |
| 2008/0081883 A1 | 4/2008 | King et al. | |
| 2010/0048828 A1 | 2/2010 | Kramer et al. | |
| 2013/0178584 A1 | 7/2013 | Jin et al. | |
| 2013/0255879 A1 | 10/2013 | Bieber et al. | |

FOREIGN PATENT DOCUMENTS

| | | |
|---|---|---|
| CN | 102993422 A | 3/2013 |
| EP | 0111986 A2 | 6/1984 |
| WO | 2012044490 A1 | 4/2012 |

OTHER PUBLICATIONS

Lin, et al., "Synthesis and Epoxy Curing of Mannich Bases Derived From Bisphenol A and Poly(Oxyalkylene) Diamine", J. Applied Polymer Science, vol. 78, pp. 615-623 (2000).

* cited by examiner

Primary Examiner — Kuo-Liang Peng
(74) Attorney, Agent, or Firm — Carl P. Hemenway

(57) ABSTRACT

An epoxy terminated polyester having the structure

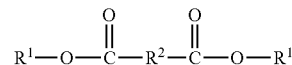

wherein $R^1$— is

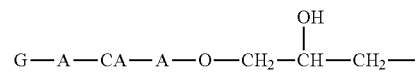

G- is

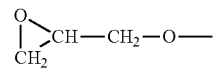

-A- is a divalent alkyl group, —CA- is a divalent cycloalkyl group, and —$R^2$— is a divalent organic group.

5 Claims, No Drawings

EPOXY-TERMINATED POLYESTER

Epoxy-terminated compounds are useful for a variety of purposes. For example, epoxy-terminated compounds may undergo chemical reactions either with themselves or with one or more co-reactant to form polymers that have high molecular weight and/or are crosslinked. Such polymers are often useful for one or more of a wide variety of purposes, such as, for example, as adhesives.

US 2008/0081883 describes polyester polyols that are reaction products of 2,5-furandicarboxylic acid and polyepoxides. It is desired to provide epoxy terminated compounds that react well with polyamines to form useful adhesive compositions, such as, for example, laminating adhesives. It is also desired to provide epoxy terminated compounds that have desirably low viscosity over the temperature range of from approximately 25° C. to approximately 70° C.

The following is a statement of the invention.

The first aspect of the present invention is an epoxy terminated polyester having the structure

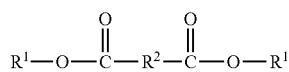

$R^1$— is

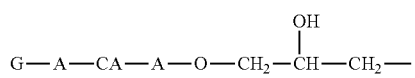

G- is

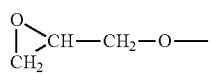

-A- is a divalent alkyl group, —CA- is a divalent cycloalkyl group, and —$R^2$— is a divalent organic group.

The following is a detailed description of the invention.

As used herein, the following terms have the designated definitions, unless the context clearly indicates otherwise.

An epoxy terminated compound is a compound that contains one or more structure I

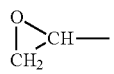

A diepoxide is a compound having exactly two groups of structure I. A glycidyl ether terminated compound is a compound that contains one or more structure II

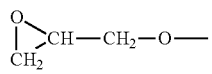

An ester linkage is the structure III

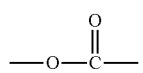

A polyester is a compound that has two or more ester linkages. A polyol is a compound that has two or more —OH groups. A diol is a compound that has exactly two —OH groups. A polyamine is a compound that has two or more amine groups; the amine groups may be primary or secondary or a mixture thereof. A diamine is a compound that has exactly two amine groups; a diamine may have two primary amine groups, two secondary amine groups, or one primary amine group and one secondary amine group. A dicarboxylic acid is a compound having exactly two —COOH groups.

An aliphatic group is a chemical group that contains only carbon and hydrogen atoms and that contains no aromatic rings. A cycloaliphatic group is an aliphatic group that contains one or more cyclic structures. An alkyl group is an aliphatic group that has no double bonds. A cycloalkyl group is an alkyl group that contains one or more cyclic structures. An aromatic group is any group having an aromatic ring.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The composition of the present invention is an epoxy terminated polyester having structure IV

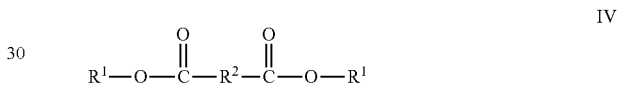

In structure IV, the two —$R^1$ groups may be identical or different. Each $R^1$ group has the structure V

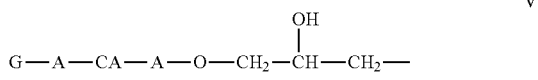

The group —$R^2$— is a divalent organic group having fewer than 50 carbon atoms. The group G- has the structure II defined herein above. The group —CA- is a cycloalkyl group. The group -A- is a divalent alkyl group.

The composition of the present invention may also contain, in addition to one or more compounds having structure IV, one or more compounds having structure IVA

where $B^1$ has the structure

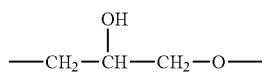

$B^2$ has the structure

and n is 1 to 6.

Preferably, —$R^2$— is a group having structure VI

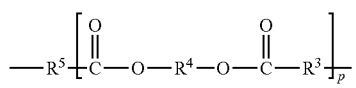

The number p is 0 to 20. Preferably p is 0 to 10; more preferably 0 to 5. Each —$R^3$—, each —$R^4$—, and each —$R^5$— is, independent of the other, a divalent organic group. Within a single —$R^2$— group, if p is 2 or greater, the various —$R^3$— groups may be identical to each other or different from each other. Within a single —$R^2$— group, if p is 2 or greater, the various —$R^4$— groups may be identical to each other or different from each other.

Preferably, —$R^3$— is selected from one or more divalent aliphatic and cycloaliphatic groups, one or more divalent aromatic hydrocarbon groups, or a mixture thereof. Among aliphatic groups, preferred are alkyl groups; more preferred are linear or branched alkyl groups; more preferred are linear alkyl groups. Among aliphatic groups, preferred are those with 1 or more carbon atoms; more preferred are those with 2 or more carbon atoms; more preferred are those with 3 or more carbon atoms. Among aliphatic groups, preferred are those with 12 or fewer carbon atoms; more preferred are those with 8 or fewer carbon atoms; more preferred are those with 6 or fewer carbon atoms. Among aliphatic groups, preferred is —$CH_2CH_2CH_2CH_2$—. Among the cycloaliphatic groups are 1,2-cyclohexane, 1,3-cyclohexane, and 1,4-cyclohexane. Among aromatic groups, preferred are those with the structure

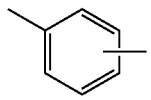

including mixtures of isomers; more preferred is

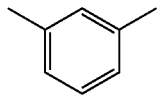

The groups that are suitable and preferred for —$R^5$— are the same as those for —$R^3$—. The group —$R^5$— may be different from all of the —$R^3$— groups, or —$R^5$— may be the same as one or all of the —$R^3$— groups.

Preferably, —$R^4$— is either an aliphatic or cycloaliphatic group or is an aliphatic ether group. An aliphatic ether group has the structure VII

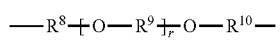

where —$R^8$— and —$R^9$— (if present) and —$R^{10}$— are aliphatic groups, and where r is 0 to 10. The groups —$R^8$— and —$R^9$— (if present) and —$R^{10}$— may be identical or may be different from each other. When —$R^4$— is an aliphatic ether group, the following preferences apply to —$R^8$—, —$R^9$— (if present), —$R^{10}$—, and r. Preferably, —$R^8$— and —$R^9$— (if present) and —$R^{10}$— are identical.

Preferably —$R^8$— and —$R^9$— (if present) and —$R^{10}$— are linear alkyl groups. Preferably —$R^8$— and —$R^9$— (if present) and —$R^{10}$— each have 4 or fewer carbon atoms; more preferably 3 or fewer carbon atoms; more preferably exactly 2 carbon atoms. Preferably, r is 0 to 10; more preferably 0 to 5; more preferably 0 to 2; more preferably zero. When —$R^4$— is an aliphatic or cycloaliphatic group, —$R^4$— is preferably an alkyl group; more preferably a linear alkyl group. When —$R^4$— is an aliphatic or cycloaliphatic group, —$R^4$— has 1 or more carbon atom. When —$R^4$— is an aliphatic or cycloaliphatic group, —$R^4$— preferably has 8 or fewer carbon atoms; more preferably 6 or carbon fewer carbon atoms; more preferably 4 or fewer carbon atoms; more preferably 3 or fewer carbon atoms; more preferably exactly 2 carbon atoms.

In some embodiments (herein called "mixed polyester" embodiments), p is greater than 1, and some of the —$R^3$— groups are not identical to other —$R^3$— groups. In some mixed polyester embodiments, —$R^2$— has the structure VIII

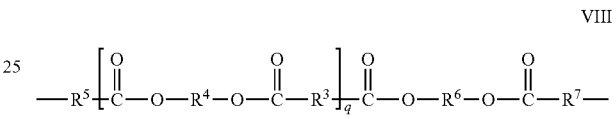

The groups —$R^3$— and —$R^4$— and —$R^5$— are as defined herein above, and q is 1 or higher. Preferably q is 0 to 9; more preferably 1 to 4. The suitable and preferable groups for —$R^6$— are the same as those for —$R^4$—. The suitable and preferable groups for —$R^7$— are the same as those for —$R^3$—. In some mixed polyester embodiments (herein called "MP1" embodiments), —$R^5$— is identical to —$R^3$—, —$R^6$— is identical to —$R^4$—, and —$R^7$— is different from —$R^3$—. In some MP1 embodiments, all the —$R^4$— groups are identical to each other; in other MP1 embodiments, some —$R^4$— groups are different from other —$R^4$— groups. In some mixed polyester embodiments (herein called "MP2" embodiments), —$R^5$— is identical to —$R^7$—, —$R^6$— is identical to —$R^4$—, and —$R^7$— is different from —$R^3$—. In some MP2 embodiments, all the —$R^4$— groups are identical to each other; in other MP2 embodiments, some —$R^4$— groups are different from other —$R^4$— groups.

Preferred embodiments are selected from the following:
(a) embodiments in which p=0;
(b) embodiments in which p is 1 or greater and in which all the —$R^3$— groups are identical to each other, all the —$R^4$— groups are identical to each other, and —$R^5$— is identical to —$R^3$—;
(c) MP1 embodiments; and
(d) MP2 embodiments;

In structure V, group -A- is a divalent alkyl group. Preferably, all the groups -A- are identical to each other. Preferably, -A- is linear. Preferably, the number of carbon atoms in -A- is 1 to 6; more preferably 1 to 4; more preferably 1 to 2; more preferably 1.

In structure V, group —CA- is a divalent cycloalkyl group. The group —CA- may be substituted with one or more methyl group, one or more linear alkyl group, or a combination thereof. The group —CA- may have a single cyclic or may be a bicyclo structure. Preferably, the number of carbon atoms in —CA- is 12 or fewer; more preferably 8 or fewer; more preferably 7 or fewer. Preferably, the number of carbon atoms in —CA- is 3 or more; more preferably 4 or more; more preferably 5 or more. Preferably, —CA- is a divalent cyclohexyl group, including all isomers thereof and mixtures thereof. More preferably, —CA- is a 1,4 divalent cyclohexyl group.

The epoxide terminated polyesters of this invention will have an Epoxide Equivalent Weight (EEW) of 275 to 1500, more preferably 285 to 1000, and more preferably 285 to 750. The number-average molecular weight of the epoxy terminated polyester of the present invention will preferably be in the range of 500 to 5000, more preferably 550 to 3100, and more preferably 550 to 2400.

It is useful to characterize the level of low molecular weight (≤1000 Daltons) species present in the composition of the present invention. The level of low molecular weight species is defined as the percentage by weight of species having molecular weight of less than or equal to 1000 Daltons, based on the total weight of the composition. The level of low molecular weight species is preferably 45% or less; more preferably 30% or less; more preferably 25% or less.

The composition of the present invention may be made by any method. A preferred method includes reacting at least one diepoxide with at least one dicarboxylic acid. The diepoxide has the structure IX

    IX

The groups G, -A-, and —CA- are defined as in structure V. The dicarboxylic acid has the structure X

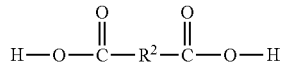    X

The group —$R^2$— is defined as in structure IV. Sufficient amount of compound having structure IX is used so that the reaction produces compound having structure IV. The reaction may also produce compounds having structure IVA.

Preferred compounds of structure X have acid value (which is measured as described below) of 110 or higher; more preferably 120 or higher; more preferably 125 or higher. Preferred compounds of structure X have acid value of 770 or lower; 260 or lower; more preferably 200 or lower; more preferably 175 or lower. Preferred compounds of structure X have molecular weight of 146 or higher; more preferably 430 or higher; more preferably 560 or higher; more preferably 640 or higher. Preferred compounds of structure X have molecular weight of 1020 or lower; more preferably 940 or lower; more preferably 900 or lower. Mixtures of suitable Mixtures of suitable compounds of structure X are also suitable are also suitable.

In the reaction of at least one diepoxide with at least one dicarboxylic acid, the stoichiometric ratio of epoxide groups to carboxylic acid groups will preferably be 3.1:1 or greater; more preferably 2.7:1 or greater; more preferably 2.2:1 or greater. The stoichiometric ratio of epoxide groups to carboxylic acid groups will preferably be 2:1 or less; more preferably 1.6:1 or less; more preferably 1.3:1 or less.

The reaction of diepoxide with dicarboxylic acid is optionally conducted in the presence of a catalyst. Preferred catalysts are triaryl phosphorous compounds with a soluble chromium compound, tetra-substituted phosphonium salts, quaternary ammonium salts, carbonate salt, hydroxide salts, and salts of carboxylic acids. More preferred are tetra-substituted phosphonium salts, carbonate salts, and salts of carboxylic acids.

When a triaryl phosphorous compound is used in combination with a chromium compound, the preferred triaryl phosphorous compounds are triaryl phosphines. Preferred triaryl phosphines are triphenyl phosphine tritolyl phosphine, trixylyl phosphine, and trinaphthyl phosphine. When a triaryl phosphorous compound is used in combination with a chromium compound, the preferred the preferred chromium compounds are chromium triacetate and chromium trichloride. Among the tetra-substituted phosphonium salts, preferred are alkyltriphenylphosphonium salts, tetraarylphosphonium salts, benzyltrialkylphosphonium salts, and tetraalkylphosphonium salts; more preferred are alkyltriphenylphosphonium salts and benzyltrialkylphosphonium salts. Among alkyltriphenylphosphonium salts, preferred are ethyltriphenylphosphonium acetate/acetic acid complex, and ethyltriphenlyphosphonium iodide; more preferred is ethyltriphenylphosphonium iodide. Among tetraalkylphosphonium salts, preferred is tetrabutylphosphonium acetate/acetic acid complex. Among benzyltrialkyl phosphonium salts, preferred is benzyltrimethyl phosphonium chloride. Among tetraarylphosphonium salts, preferred is tetraphenylphosphonium bromide.

Among the quaternary ammonium salts, preferred are benzyltrimethylammonium chloride, tetramethylammonium chloride, and diphenyldimethylammonium chloride. Among the salts of carboxylic acids, preferred are sodium or potassium salts of mono-carboxylic acids; more preferred are sodium acetate, potassium acetate, sodium propionate, potassium propionate, sodium benzoate, potassium benzoate, sodium citrate, potassium citrate, sodium lactate, potassium lactate, sodium tartrate, potassium tartrate, and sodium potassium tartrate. Among the inorganic bases, preferred are sodium carbonate, potassium carbonate, sodium hydroxide, and potassium hydroxide.

The preferred catalysts for the preparation of epoxy terminated polyesters are ethyltriphenlyphosphonium iodide, benzyltrimethylammonium chloride, sodium carbonate, and sodium acetate.

When tin or titanate compounds are used in the preparation of carboxylic terminated polyester resins via the reaction of diol with dicarboxylic acid, the level preferably is in the range of 0.0001 to 0.05 wt %.

When the group —R2- has structure VI with p of 1 or greater, the compound having structure X is preferably made by one or more reaction of one or more dicarboxylic acid with one or more diol.

Embodiment (a) defined herein above is preferably made by reaction of a diepoxide with a dicarboxylic acid having the structure HOOC—$R^{11}$—COOH. Suitable and preferred —$R^{11}$— groups are the same as the suitable and preferred —$R^3$— groups.

Embodiment (b) defined herein above is preferably made by reaction of a diepoxide with a dicarboxylic acid that is a polyester (herein called "PEb1"). PEb1 is preferably made by reacting a single dicarboxylic acid ("DAb1") with a single diol ("DOb1"). DAb1 has the structure HOOC—$R^{12}$—COOH. Suitable and preferred —$R^{12}$— groups are the same as the suitable and preferred —$R^3$— groups. DOb1 has the structure HO$R^{13}$—OH, where the suitable and preferred —$R^{13}$— groups are the same as those described herein above for —$R^4$— groups. The —$R^4$— group may be, for example, an aliphatic or cycloaliphatic group or structure VII. A sufficient amount of DAb1 is used so that the reaction with DOb1 will produce a polyester that is a dicarboxylic acid.

Embodiment (c) defined herein above is preferably made by reaction of a diepoxide with a dicarboxylic acid that is a polyester (herein called "PEc1"). PEc1 is preferably made by reacting a single dicarboxylic acid ("DAc1") with an intermediate polyester ("PEc2"). DAc1 has the structure HOOC—$R^{13}$—COOH. Suitable and preferred —$R^{13}$— groups are the same as the suitable and preferred —$R^3$— groups. PEc2 is preferably made by reaction of a dicarboxylic acid ("DAc2") with one or more diol ("DOc1"). DAc2 has the structure HOOC—$R^{14}$—COOH. Suitable and preferred —$R^{14}$— groups are the same as the suitable and preferred —$R^3$— groups. Preferably DAc2 is different from DAc1. DOc1 has the structure HOR$^{15}$—OH, where the suitable and preferred —$R^{15}$— groups are the same as those described herein above for —$R^4$— groups. The —$R^4$— group may be, for example, an aliphatic or cycloaliphatic group or have the structure VII. Relative amounts of DOc1 and DAc2 are used so that a significant amount of the product PEc2 is formed that has one terminal —OH group and one terminal —COOH group.

Embodiment (d) defined herein above is preferably made by reaction of a diepoxide with a dicarboxylic acid that is a polyester (herein called "PEd1"). PEd1 is preferably made by reacting a single dicarboxylic acid ("DAd1") with an intermediate polyester ("PEd2"). DAd1 has the structure HOOC—$R^{16}$—COOH. Suitable and preferred —$R^{16}$— groups are the same as the suitable and preferred —$R^3$— groups. PEd2 is preferably made by reaction of a dicarboxylic acid ("DAd2") with one or more diol ("DOd1"). DAd2 has the structure HOOC—$R^{17}$—COOH. Suitable and preferred —$R^{17}$— groups are the same as the suitable and preferred —$R^3$— groups. Preferably DAd2 is different from DAd1. DOd1 has the structure HOR$^{18}$—OH, where the suitable and preferred —$R^{18}$— groups are the same as those described herein above for —$R^4$— groups. The —$R^4$— group may be, for example, an aliphatic or cycloaliphatic group or have the structure VII. Relative amounts of DOd1 and DAd2 are used so that a significant amount of the product PEd2 is formed that has two terminal —OH groups.

Reactions between carboxylic acid groups and hydroxyl groups are preferably conducted in the presence of one or more catalyst. Preferred catalysts are tin compounds and titanate compounds. Among tin compounds, preferred are dibutyltins, tetrabutyltins, tin tetrachloride, dioctyltins, monobutyltins, and stannous tins; more preferred are hydroxybutyltin oxide, monobutyltin tris(2-ethylhexanoate), and stannous 2-ethylhexanoate. Among titanate compounds, preferred are tetraalkyltitanates; more preferred are tetra (iso-propyl) titanate and tetra(n-butyl) titanate.

For reactions between carboxylic acid groups and hydroxyl groups, when a catalyst is present, the preferred amount is 0.0001% to 0.05% by weight based on the sum of the weights of the compounds bearing carboxylic acid groups plus the compounds bearing hydroxyl groups.

The compositions of the present invention may be used for a wide variety of purposes. Preferably, a composition of the present invention is used as an ingredient in an adhesive composition that is used to bond a first substrate to a second substrate. Preferably, one or more composition of the present invention is mixed with a curative compound and optionally with a solvent; the mixture is applied to a first substrate to form a layer on the first substrate; solvent (if present) is evaporated or allowed to evaporate; a second substrate is brought into contact with the layer of the mixture; and the mixture is cured or allowed to cure.

Curative compounds are compounds that have two or more groups capable of reacting with epoxy groups. Preferred curative compounds are amino compounds. Preferred amino compounds are phenalkamines, phenalkamides, and amine-terminated amide resins. Amine-terminated amide resins are reaction products of dicarboxylic acids and diamines. For formation of amine-terminated amide resins, preferred dicarboxylic acids are dimer acids, which are the reaction products of two molecules of an unsaturated fatty acid. Unsaturated fatty acids have the structure $R^{19}$—COOH, where $R^{19}$— is an aliphatic group having eight or more carbon atoms one or more carbon-carbon double bond. Preferred diamines are ethylenediamine, diethylenetriamine, triethylenetriamine, tetraethylenepentamine, piperazine, aminoethylpiperazine, isophorone diamine, xylylenediamine, and mixtures thereof.

Preferred substrates are polymer films, metalized polymer films, metal foils, polymer-backed metal foils, ceramic coated polymer films, and combinations thereof.

The following are examples of the present invention. Abbreviations used below are as follows:

AV=Acid Value, measured by the method of ASTM D3644-06 (American Society for testing and Materials, Conshohocken, Pa., USA).

OHN=Hydroxyl Number, measured by the method of ASTM E1899-08.

Amine Value=measured by the method ASTM D2074-07 for Test Methods for Total, Primary, Secondary, and Tertiary Amine Values of Fatty Amines by Alternative Indicator Method.

Visc.=Viscosity, which is measured by employing a Brookfield RV DV-II+ Viscometer with a thermostated small sample adapter with a spindle #27 and varying the temperature over a range of 25 to 70° C. in increments of 5° C. and allowing the sample to stabilize at temperature for 20 to 30 mins prior to recording viscosity.

Fascat™ 9100=hydroxybutyltin oxide, from Arkema, Inc., commercial grade

CHDM-DGE=1,4-cyclohexanedimethanol diglycidyl ether (structure IX in which both -A- groups are —$CH_2$— and the —CA- group is 1,4-cyclohexyl), purity is greater than 99.0% by weight; EEW is 129.9, SEC Analysis: Mn 200, Mw 200, Mz 200, Wt. Fraction ≤500 Daltons 98.8%, Wt. Fraction ≤1000 Daltons 99.9%.

Crude CHDM-DGE=crude grade, purity=79.5% 1,4-cyclohexanedimethanol diglycidyl ether; contains other mono-, di-, and tri-epoxides; EEW is 135.24, SEC Analysis: Mn 200, Mw 300, Mz 600, Wt. Fraction ≤500 Daltons 77.3%, Wt. Fraction ≤1000 Daltons 96.1%.

Erisys™ GE-22=CHDM-DGE, from CVC Thermoset Specialties, commercial grade, purity=53.8% 1,4-cyclohexyldimethanal diglycidyl ether Impurities are other diepoxides, monoepoxides, etc. Batch A: EEW is 147.61, (SEC Analysis: Mn 225, Mw 250, Mz 300, Wt. Fraction ≤500 Daltons 96.8%, Wt. Fraction ≤1000 Daltons 99.4%) and Batch B:156.56, (SEC Analysis: Mn 200, Mw 300, Mz 400, Wt. Fraction ≤500 Daltons 93.0%, Wt. Fraction ≤1000 Daltons 99.2%).

Unidyme™ 22=dimerized fatty acid, from Arizona Chemical, AV=192.9.

Cardolite™ NC-541LV=phenalkamine curing agent, from Cardolite Corporation; Amine Value is 340, Active Hydrogen Equivalent is 125.

Polypox™ HO15=Mannich base curing agent, from The Dow Chemical Company; Amine Value of 375, Active Hydrogen Equivalent is 75.

Polypox™ P370=polyaminoimidazoline hardener for epoxy resins, from The Dow Chemical Company; Amine Value of 485; Active Hydrogen Equivalent is 95.

Epikure™ 3140=polyamide curing agent, reaction product of dimerized fatty acid and polyamines, from Momentive; Amine Value of 375; Active Hydrogen Equivalent of 95.

Priamine™ 1071=dimer diamine from Croda

Jeffamine™ D400=polyetheramine from Huntsman

Coex PP (75SLP)=Exxon Mobil Bicor SLP Oriented Polypropylene, Non-Heat Sealable, thickness 19 micrometers (0.75 mils).

Coex PP (70SPW)=Exxon Mobil Bicor SPW Coextruded Polypropylene, thickness 18 micrometers (0.70 mils).

PET=DuPont, Polyester, Poly(ethylene glycol-terephthalate), thickness 23 micrometer (92 Gauge) thick polyester film.

PE (GF-19)=Berry Plastics Corp., High slip low density polyethylene film, thickness 25.4 micrometers (1.0 mil).

Nylon=Honeywell Capran Emblem 1500, Biaxially Oriented Nylon 6 Film, thickness 15 micrometers.

PET-Met=FILMTech Inc., Metallized Polyester film, thickness 25.4 micrometers.

OPP-Met=AET Films, Metallized Oriented Polypropylene Film, MT Film, Heat Sealable, thickness 18 micrometers.

Backed Foil=12 micrometer (48 Gauge) Polyester (PET) Film laminated to 0.00035 mil Al Foil with Adcote 550/Coreactant F at 3.26 g/m$^2$ (2.00 lbs/ream).

PET (92LBT)=DuPont, Polyester, Poly(ethylene glycol-terephthalate), thickness 23 micron (92 Gauge).

Mn=number-average molecular weight

Mw=weight-average molecular weight

Mz=z-average molecular weight

EEW=epoxy equivalent weight, which is the mass per mole of epoxy groups

Active Hydrogen Equivalent=mass per mole of active hydrogens; an active hydrogen is a hydrogen atom attached to the nitrogen atom of an amine group.

Wt Fraction 500=Weight Fraction having molecular weight less than or equal to 500

Wt Fraction 1000=Weight Fraction having molecular weight less than or equal to 1000

EXAMPLE 1: POLYESTER PREPARATION

| Item | Ingredient | Charge (g) |
|---|---|---|
| 1 | Poly(Diethylene Glycol -Adipic Acid), OHN = 240 | 2051.00 |
| 2 | Phthalic Anhydride | 1269.20 |

Items 1 and 2 were Charged to reactor; Degassed/Nitrogen Purged Resin; Slowly heated resin mixture to 100° C.; Maintained at 100-115° C. for 1.5 Hrs; Checked AV and Viscosity. If AV>155 then heated to 145° C. Maintained at 145-150° C. until AV of ca. 155. Cooled to about 70 to 80° C., Filtered and packaged The final resin had the following properties: Acid Value (AV) 147.94, Mn 300, Mw 700, Mz 1100, Wt. Fraction ≤500 Daltons 42.4%, Wt. Fraction ≤1000 Daltons 75.9%, Viscosity at 25° C. of 78375 mPa*s.

EXAMPLE 2: POLYESTER PREPARATION

| Item | Ingredient | Charge (g) |
|---|---|---|
| 1 | Adipic Acid | 1986.40 |
| 2 | Diethylene Glycol | 1078.60 |
| 3 | Fascat 9100 (Hydroxybutyltin oxide) | 1.0879 |

Charged Items 1-3 to vessel at Ambient Temperature (25-30° C.). Heated resin to 100° C. under Nitrogen with stirring. Maintain at 100° C. for 0.50 Hrs. Heat resin to 225° C. and hold at 225° C., When ca. 80% of theoretical water was removed, Monitored AV and In-Process Viscosity. Maintained at 225° C. until AV<ca. 180. When AV<180 applied Vacuum; Maintained at 225° C. and ca. 325 mm until AV<155. Cool Resin to about 150° C.; Filter and Package.

The final resin had the following properties: Acid Value (AV) 140.39, Mn 950, Mw 1650, Mz 3350, Wt. Fraction ≤500 Daltons 11.4%, Wt. Fraction ≤1000 Daltons 32.1%, Viscosity at 25° C. of 4070 mPa*s.

EXAMPLE 3: POLYESTER PREPARATION

| Item | Ingredient | Charge (g) |
|---|---|---|
| 1 | Adipic Acid | 2315.50 |
| 2 | Diethylene Glycol | 1080.50 |
| 3 | Fascat 9100 (Hydroxybutyltin oxide) | 1.0220 |

Charged Items 1-3 to vessel at Ambient Temperature (25-30° C.). Heat resin to 100° C. under Nitrogen with stirring. Maintained at 100° C. for 0.50 Hrs. Heated resin to 225° C. and held at 225° C., When ca. 80% of theoretical water was removed, Monitored AV and In-Process Viscosity. Maintained at 225° C. until AV<ca. 225. When AV<225 applied Vacuum; Maintained at 225° C. and ca. 325 mm until AV<205. Cooled Resin to about 150° C.; Filter and Package.

The final resin had the following properties: Acid Value (AV) 203.68, Mn 650, Mw 1150, Mz 1600, Wt. Fraction ≤500 Daltons 26.6%, Wt. Fraction ≤1000 Daltons 50.3%, Viscosity at 35° C. of 33050 mPa*s.

EXAMPLE 4: POLYESTER PREPARATION

| Item | Ingredient | Charge (g) |
|---|---|---|
| 1 | Isophthalic Acid | 451.50 |
| 2 | Diethylene Glycol | 1081.30 |
| 3 | Fascat 9100 (Hydroxybutyltin oxide) | 0.5543 |
| 4 | Adipic Acid | 1600.78 |

Charged Items 1-3 to vessel at Ambient Temperature (25-30° C.). Heated resin to 100° C. under Nitrogen with stirring. Heated resin to 225° C. and held at 225° C. When ca.50% of theoretical water was off. Monitored AV and In-Process Viscosity. Maintained at 225° C. until AV<ca. 75. Cooled Resin to <125° C. Add Item 4; Maintained at 125-135° C. for 0.50 Hrs. Increased Temp to 225° C. and Maintained at 225° C. Monitored AV and Visc; Maintained at 225° C. until AV<ca. 155. Cooled Resin to about 150° C.; Filtered and Packaged.

The final resin had the following properties: Acid Value (AV) 149.73, Mn 950, Mw 1750, Mz 2550, Wt. Fraction ≤500 Daltons 10.6%, Wt. Fraction ≤1000 Daltons 32.1%, Viscosity at 25° C. of 29500 mPa*s.

EXAMPLE 5: POLYESTER PREPARATION

| Item | Ingredient | Charge (g) |
|---|---|---|
| 1 | Isophthalic Acid | 451.94 |
| 2 | Diethylene Glycol | 567.80 |
| 3 | Ethylene Glycol | 316.34 |
| 4 | Fascat 9100 (Hydroxybutyltin oxide) | 0.6028 |
| 5 | Adipic Acid | 1601.83 |

Charged Items 1-4 to vessel at Ambient Temperature (25-30° C.). Heated resin to 100° C. under Nitrogen with stirring. Heated resin to 225° C. and hold at 225° C., When ca.50% of theoretical water was off. Monitored AV and In-Process Viscosity. Maintained at 225° C. until AV<ca. 75. Cooled Resin to <125° C. Added Item 5; Maintained at 125-135° C. for 0.50 Hrs. Increased Temp to 225° C. and Maintained at 225° C. Monitored AV and Visc; Maintained at 225° C. until AV<ca. 155. Cooled Resin to about 150° C.; Filtered and Packaged The final resin had the following properties: Acid Value (AV) 157, Mn 750, Mw 1500, Mz 2350, Wt. Fraction ≤500 Daltons 18.1%, Wt. Fraction ≤1000 Daltons 41.3%, Viscosity at 25° C. of 22175 mPa*s.

EXAMPLES 6-24: PREPARATIONS OF EPOXIDE TERMINATED POLYESTER RESINS

The preparations in Examples 6-24 were similar. Diepoxide, one or more diacid, and catalyst (if used) were charged to the reactor. Slowly Heated to 135-140° C. Maintained at 135-140° C. for 2 Hr and then monitored AV and Viscosity. Maintained at 135-140° C. and monitored AV and Visc until AV<1.0. Transferred Resin and Package.

Examples 6-24 were as follows:

TABLE 1

| Example Number: | 6 | 7 | 8 | 9 | 10 | 11 | 12 |
|---|---|---|---|---|---|---|---|
| Ingredient (g) | | | | | | | |
| Erisys GE-22 (EEW 147.61) | 252.11 | 250.31 | | 350.38 | 255.13 | 300.70 | 452.94 |
| CHDM-DGE (EEW 129.29) | | | 225.33 | | | | |
| Polyester Resin of Ex. 1 | 226.99 | | | | | | |
| Polyester Resin of Ex. 2 | | 248.1 | 357.16 | | | 233.37 | |
| Polyester Resin of Ex. 3 | | | | 262.66 | | | |
| Polyester Resin of Ex. 4 | | | | | 227.27 | | |
| Isophthalic Acid | | | | | | 20.07 | 90.41 |
| EthylTriphenylphosphonium Iodide | 0.2529 | 0.2557 | 0.2630 | 0.2680 | 0.2575 | 0.3085 | 0.2713 |
| Properties | | | | | | | |
| EEW | 563 | 592 | 729 | 534 | 495 | 562 | 321 |
| Acid Value | 1.10 | 0.81 | 0.90 | 0.65 | 0.67 | 0.59 | 0.76 |
| Mn | 1250 | 1000 | 2300 | 1050 | 1150 | 1050 | 750 |
| Mw | 5100 | 5350 | 7250 | 6150 | 6200 | 5500 | 2450 |
| Mz | 11200 | 11800 | 13900 | 14950 | 15250 | 13450 | 5100 |
| Wt. Fraction 500 (%) | 12.1 | 16.7 | 7.4 | 14.9 | 15.3 | 16.7 | 24.9 |
| Wt. Fraction 1000 (%) | 18.9 | 22.2 | 9.4 | 21.1 | 20.3 | 22.5 | 33.2 |
| Viscosity at 25° C. (mPa*s) | 38300 | 9975 | 22975 | 18100 | 15650 | 14850 | 23800 |
| Viscosity at 70° C. (mPa*s) | 1055 | 588 | 1240 | 838 | 738 | 710 | 648 |

TABLE 2

| Example Number | 13 | 14 | 15 | 16 | 17 | 18 | 19 |
|---|---|---|---|---|---|---|---|
| Ingredient (g) | | | | | | | |
| Erisys GE-22 (EEW 147.61) | 400.53 | | 300.18 | 250.97 | | | |
| Erisys GE-22 (EEW 156.56) | | 401.08 | | | 400.50 | 309.07 | 302.02 |
| Polyester Resin of Ex. 2 | | | | | | 232.22 | 233.42 |
| Polyester Resin of Ex. 5 | | | 268.98 | 298.98 | | | |
| Isophthalic Acid | 112.66 | | | | | 24.16 | 24.15 |
| Adipic Acid | | 93.43 | | | 70.52 | | |
| EthylTriphenylphosphonium Iodide | 0.2704 | 0.2532 | 0.2565 | 0.2566 | 0.2481 | | |

TABLE 2-continued

| Example Number | 13 | 14 | 15 | 16 | 17 | 18 | 19 |
|---|---|---|---|---|---|---|---|
| Properties | | | | | | | |
| EEW | 445 | 439 | 544 | 809 | 289 | 710 | 549 |
| Acid Value | 0.66 | 0.04 | 0.05 | 0.05 | 0.04 | 0.04 | 0.08 |
| Mn | 950 | 850 | 850 | 1300 | 600 | 1050 | 1100 |
| Mw | 4650 | 5350 | 6050 | 7550 | 2100 | 6500 | 5450 |
| Mz | 12550 | 17800 | 18300 | 19850 | 5700 | 19150 | 13600 |
| Wt. Fraction 500 (%) | 16.8 | 21.3 | 17.8 | 11.0 | 34.0 | 15.0 | 14.8 |
| Wt. Fraction 1000 (%) | 25.6 | 30.4 | 26.1 | 17.3 | 43.4 | 22.5 | 22.2 |
| Viscosity at 25° C. (mPa*s) | (1) | 33650 | 22375 | 70600 | 6850 | 40000 | 33063 |
| Viscosity at 70° C. (mPa*s) | 6738 | 1088 | 920 | 2255 | 320 | 1545 | 1335 |

(1) Viscosity at 30° C. was 410,000 mPa*s

TABLE 3

| Example Number | 20 | 21 | 22 | 23 |
|---|---|---|---|---|
| Ingredient (g) | | | | |
| Erisys GE-22 (EEW 147.61) | | | | 670.85 |
| Crude CHDM-DGE (EEW 135.24) | 454.02 | 300.18 | 302.18 | |
| Polyester Resin of Ex. 2 | | | 307.90 | |
| Polyester Resin of Ex. 5 | | 311.62 | | 510.34 |
| Isophthalic Acid | 96.89 | | 5.58 | |
| EthylTriphenylphosphonium Iodide | | | | 0.6139 |
| Properties | | | | |
| EEW | 290 | 545 | 533 | 501 |
| Acid Value | 0.11 | 0.08 | 0.06 | 0.31 |
| Mn | 550 | 1150 | 1150 | 500 |
| Mw | 3600 | 5500 | 6050 | 3450 |
| Mz | 11900 | 12550 | 14350 | 8200 |
| Wt. Fraction 500 (%) | 24.6 | 11.3 | 11.5 | 24.0 |
| Wt. Fraction 1000 (%) | 39.5 | 17.9 | 17.9 | 35.1 |
| Viscosity at 25° C. (mPa*s) | 63800 | 53000 | 32650 | 15350 |
| Viscosity at 70° C. (mPa*s) | 1372 | 1835 | 1525 | 675 |

EXAMPLE 24: PREPARATION OF AMINE CURATIVE

| Item | Ingredient | Charge (g) |
|---|---|---|
| 1 | Unidyme 22 | 435.94 |
| 2 | Aminoethylpiperazine | 242.56 |

Charged Item 1 and 2 to reactor. Slowly Heated to 200° C. Maintained at 200° C. for 2 Hr; monitor water evolution. Increase temp to 225-230° C.; Maintained for 1 Hr. Transferred Resin and Package.

The final resin had the following properties: Amine Value 217.15, Viscosity at 25° C. 51100 mPa*s.

EXAMPLE 25: PREPARATION OF AMINE CURATIVE

| Item | Ingredient | Charge (g) |
|---|---|---|
| 1 | Unidyme 22 | 877.12 |
| 2 | Aminoethylpiperazine | 488.24 |

Charged Item 1 and 2 to reactor. Slowly Heated to 200° C. Maintained at 200° C. for 2 Hr; monitor water evolution. Transferred Resin and Package The final resin had the following properties: Amine Value 238.9, Viscosity at 25° C. 49000 mPa*s.

The adhesion properties of the epoxy terminated polyesters were evaluated with Amine based resins using a series of laminate constructions. These two part adhesive systems were evaluated via a solvent hand casting method and laminator.

The following abbreviations are used to describe test results: as: adhesive split; ftr: film tear; fstr: film stretch; at: adhesive transfer; sec: secondary; zip: zippery bond; pmt: partial metal transfer. Adhesion bond strengths were determined on a 15 mm wide strip of laminate on a Thwing-Albert Tensile Tester (Model QC-3A) with a 50 Newton load cell at a 10.0 cm/min rate.

Examples 26-52 were performed as follows: An epoxy terminated polyester was mixed with a curing agent at the mix ratio shown below, in ethyl acetate at 50% concentration by weight. The solution was coated on a first substrate to yield a dry coating weight of 1.6276 g/m² (1.0 lb/ream). A second substrate was applied to the dried coating and the resulting laminate was cured at room temperature (approximately 25° C.). The bond strength was examined as a function of curing time and is reported below. The "Mix ratio" is the weight ratio of epoxy resin to curing agent, expressed as 100:X. In the column labeled "laminate structure," the first substrate is listed, followed by the second substrate.

As an example, in the table below, Example number 26 was a mixture of epoxy resin made in Example 6, mixed with curing agent Cardolite™ NC-541LV, at a weight ratio of epoxy resin to curing agent of 100:23.9. The bond strength at 7 days was 0.74 Newton for a width of 15 mm, and the failure mode was adhesive split.

TABLE 4

| Example Number | 26 | | 27 | | 28 | |
|---|---|---|---|---|---|---|
| Epoxy Resin from Ex. No. | 6 | | 6 | | 7 | |
| Curing agent | Cardolite ™ NC-514LV | | PolyPox ™ H015 | | PolyPox ™ H015 | |
| Mix Ratio | 100:23.9 | | 100:14.3 | | 100:12.5 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 0.74, as | 0.87, ftr | 3.47, ftr | 3.11, ftr | 2.77, ftr | 2.90, ftr |
| CoexPP (75SLP)/PE (GF-19) | 1.14, as | 1.17, as | 3.85, as | 2.69, as | 2.01, as | 2.80, as |
| PET/PE (GF-19) | 0.85, as | 1.06, as | 2.24, as, fstr | 2.35, as, fstr | 1.30, as | 1.54, as |
| Nylon/PE (GF-19) | 1.16, as | 1.24, as | 3.34, ftr | 2.05, as | 1.08, as | 1.12, ftr |
| PET-Met/PE (GF-19) | 0.99, as | 1.27, as | 2.04, ftr | 1.61, as | 0.28, as | 0.70, as |
| OPP-Met/PE (GF-19) | 1.18, as | 1.46, as | 4.52 fstr, ftr | 2.53, as | 2.24, as | 2.71, as |
| OPP-Met/CoexPP (70SPW) | 1.25, as | 2.08, ftr | 3.18, ftr | 2.43, ftr | 1.33, as | 2.36, ftr |
| Backed Foil/Nylon | 0.80, as | 0.68, as | 1.16, as | 1.32, sec, at | 0.16, as | 0.41, sec, at |
| Backed Foil/PET (92LBT) | 0.67, as | 0.57, as | 0.42, as | 0.58, sec, at | 0.25, sec, at | 0.28, sec, at |
| Backed Foil/PE (GF-19) | 1.14, as | 0.74, as | 0.93, as | 0.58, sec, at | 0.22, sec, at | 0.49, sec, at |

TABLE 5

| Example Number | 29 | | 30 | | 31 | |
|---|---|---|---|---|---|---|
| Epoxy Resin from Ex. No. | 8 | | 9 | | 10 | |
| Curing agent | PolyPox ™ H015 | | PolyPox ™ H015 | | PolyPox ™ H015 | |
| Mix Ratio | 100:10.0 | | 100:14.0 | | 100:15.0 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 0.92, as | 2.42, ftr | 1.17, ftr | 1.62, ftr | 1.67, ftr | 1.33, ftr |
| CoexPP (75SLP)/PE (GF-19) | 2.60, as | 1.66, as | 1.91, as | 1.79, as | 3.19, ftr | 3.04, ftr |
| PET/PE (GF-19) | 1.28, as | 1.16, as | 1.22, as | 1.28, as | 1.14, as | 1.60, as |
| Nylon/PE (GF-19) | 1.06, as | 1.88, ftr | 0.70, as | 0.61, as | 1.54, as | 1.55, as |
| PET-Met/PE (GF-19) | 0.47, as | 0.40, as | 0.59, as | 0.81, as | 0.66, as | 0.48, as |
| OPP-Met/PE (GF-19) | 2.16, as | 1.32, as | 1.23, as | 1.44, as | 1.98, as | 1.70, as |
| OPP-Met/CoexPP (70SPW) | 1.55, as | 1.25, as | 1.14, as | 1.53, as | 1.39, as | 1.80, as |
| Backed Foil/Nylon | 0.31, sec, at | 0.22, sec, at | 0.30, sec, at | 0.14, sec, at | 0.07, sec, at | 0.11, sec, at |
| Backed Foil/PET (92LBT) | 0.36, sec, at | 0.25, sec, at | 0.15, sec, at | 0.11, sec, at | 0.11, sec, at | 0.15, sec, at |
| Backed Foil/PE (GF-19) | 0.68, sec, at | 0.21, sec, at | 0.57, sec, at | 0.67, sec, at | 0.14, sec, at | 0.13. sec, at |

TABLE 6

| Example Number | 32 | | 33 | | 34 | |
|---|---|---|---|---|---|---|
| Epoxy Resin from Ex. No. | 11 | | 12 | | 13 | |
| Curing agent | PolyPox ™ H015 | | Poly Pox ™ H015 | | PolyPox ™ H015 | |
| Mix Ratio | 100:16.3 | | 100:24.0 | | 100:20.0 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 3.11, ftr | 2.13, ftr | 1.70, ftr | 2.13, ftr | 1.34, ftr | 2.32, ftr |
| CoexPP (75SLP)/PE (GF-19) | 2.75, ftr | 1.23, as | 2.41, fstr, as | 3.93, ftr | 5.00, ftr | 5.20, ftr |
| PET/PE (GF-19) | 1.74, as | 2.02, as | 3.13, ftr | 2.04, as | 1.46, as | 4.32, ftr |
| Nylon/PE (GF-19) | 1.66, as | 1.83, as | 2.90, ftr | 2.91, ftr | 6.10, ftr | 6.21, ftr |
| PET-Met/PE (GF-19) | 0.92, as | 0.60, as | 2.28, ftr | 1.91, ftr | 4.02, ftr | 6.34, ftr |
| OPP-Met/PE (GF-19) | 1.72, as | 2.04, as | 2.45, as | 4.27, ftr | 4.52, ftr | 2.57, ftr |
| OPP-Met/CoexPP (70SPW) | 1.81, ftr | 1.40, as | 2.12, as | 2.21, ftr | 2.79, ftr | 1.91, ftr |
| Backed Foil/Nylon | 0.12, sec, at | 0.09, sec, at | 1.61, ftr | 0.55, as | 0.82, as | 0.54, as |
| Backed Foil/PET (92LBT) | 0.08, sec, at | 0.12, sec, at | 1.47, ftr | 1.57, as | 0.80, as | 0.23, as |
| Backed Foil/PE (GF-19) | 0.61, sec, at | 0.39, sec, at | 2.12, as | 2.69, ftr | 2.29, as | 1.87, as |

TABLE 7

| Example Number | 35 | | 36 | | 37 | |
|---|---|---|---|---|---|---|
| Epoxy Resin from Ex. No. | 14 | | 11 | | 12 | |
| Curing agent | PolyPox ™ H015 | | Epikure ™ 3140 | | Epikure ™ 3140 | |
| Mix Ratio | 100:19.4 | | 100:16.9 | | 100:29.6 | |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 2.11, ftr | 2.05, ftr | 2.11, ftr | 1.74, ftr | 2.61, ftr | 2.60, ftr |
| CoexPP (75SLP)/PE (GF-19) | 2.52, ftr | 4.03, ftr | 1.74, as | 2.54, ftr | 5.38, ftr | 3.85, ftr |
| PET/PE (GF-19) | 2.57, as | 3.40, ftr | 1.22, as | 1.35, as | 4.20, ftr | 6.62, ftr |
| Nylon/PE (GF-19) | 2.56, ftr | 2.50, ftr | 1.39, as | 1.60, ftr | 6.40, ftr | 6.03, ftr |
| PET-Met/PE (GF-19) | 2.95, ftr | 2.57, ftr | 1.07, as | 0.80, as | 3.21, ftr | 4.08, ftr |
| OPP-Met/PE (GF-19) | 2.21, ftr | 2.06, ftr | 0.98, as | 1.14, as | 6.42, ftr | 6.66, ftr |
| OPP-Met/CoexPP (70SPW) | 1.13, as | 2.77, ftr | 1.08, as | 2.32, ftr | 3.09, ftr | 2.81, ftr |
| Backed Foil/Nylon | 0.77, as | 0.32, as | 0.60, as | 0.37, as | 2.07, as | 1.22, as |
| Backed Foil/PET (92LBT) | 0.40, as | 0.28, as | 0.34, as | 0.13, as | 2.35, ftr | 1.52, as |
| Backed Foil/PE (GF-19) | 0.98, as | 1.14, as | 0.96, as | 0.60, as | 2.73, as | 1.66, as |

TABLE 8

| Example Number | 38 | | 39 | | 40 | |
|---|---|---|---|---|---|---|
| Epoxy Resin from Ex. No. | 17 | | 15 | | 16 | |
| Curing agent | Polypox ™ H015 | | Polypox ™ H015 | | Polypox ™ H015 | |
| Mix Ratio | 100:25.9 | | 100:13.8 | | 100:9.2 | |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 2.50, ftr | 2.07, ftr | 2.32, ftr | 2.80, ftr | 2.31, ftr | 1.68, ftr |
| CoexPP (75SLP)/PE (GF-19) | 2.64, ftr | 1.88, ftr | 2.82, as | 4.28, ftr | 2.28, as | 3.04, ftr |
| PET/PE (GF-19) | 2.47, as | 2.23, as | 1.51, as | 1.63, as | 1.15, as | 0.95, as |
| Nylon/PE (GF-19) | 3.15, ftr | 1.68, as | 1.89, as | 1.45, as | 1.81, as | 1.30, as |
| PET-Met/PE (GF-19) | 2.31, ftr | 1.28, as | 1.04, as | 0.86, as | 1.20, as | 0.73, as |
| OPP-Met/PE (GF-19) | 2.45, as | 2.87, ftr | 1.68, as | 1.39, as | 2.02, as | 2.67, as |
| OPP-Met/CoexPP (70SPW) | 2.32, ftr | 1.96, ftr | 2.23, ftr | 2.03, ftr | 1.35, as | 2.31, ftr |
| Backed Foil/Nylon | 0.11, sec, at | 0.21, sec, at | 0.10, sec, at | 0.41, sec, at | 0.43, sec, at | 0.15, sec, at |
| Backed Foil/PET (92LBT) | 0.11, sec, at | 0.18, sec, at | 0.09, as | 0.23, sec, at | 0.11, sec, at | 0.12, sec, at |
| Backed Foil/PE (GF-19) | 1.47, sec, at | 1.31, sec, at | 0.27, sec, at | 0.41, sec, at | 0.70, sec, at | 0.51, sec, at |

TABLE 9

| Example Number | 41 | | 42 | | 43 | |
|---|---|---|---|---|---|---|
| Epoxy Resin from Ex. No. | 15 | | 20 | | 21 | |
| Curing agent | Epikure ™ 3140 | | Polypox ™ H015 | | Polypox ™ H015 | |
| Mix Ratio | 100:17.5 | | 100:25.9 | | 100:13.8 | |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.89, ftr | 2.88, ftr | 1.64, ftr | 1.91, ftr | 2.05, ftr | 1.20, ftr |
| CoexPP (75SLP)/PE (GF-19) | 2.54, ftr | 2.85, ftr | 6.02, ftr | 6.73, fstr, ftr | 2.38, ftr | 3.50, ftr |
| PET/PE (GF-19) | 1.09, as | 1.25, as | 2.03, as | 5.96, as | 0.92, as | 1.48, as |
| Nylon/PE (GF-19) | 1.19, as | 1.80, as | 3.16, ftr | 6.61, ftr | 1.47, ftr | 1.10, as |
| PET-Met/PE (GF-19) | 0.71, as | 1.08, as | 4.44, ftr | 6.37, ftr | 0.40, as | 0.73, as |
| OPP-Met/PE (GF-19) | 2.14, ftr | 1.56, ftr | 4.11, ftr | 3.61, ftr | 1.77, ftr | 1.23, as |
| OPP-Met/CoexPP (70SPW) | 0.96, as | 1.79, ftr | 1.61, ftr | 2.11, ftr | 1.29, as | 1.30, as |
| Backed Foil/Nylon | 0.15, a | 0.32, as | 1.33, ftr | 0.63, as | 0.27, as | 0.32, as |
| Backed Foil/PET (92LBT) | 0.10, as | 0.12, as | 1.35, as | 1.25, as | 0.18, as | 0.18, as |
| Backed Foil/PE (GF-19) | 0.57, as | 0.70, as | 1.54, as | 1.35, as | 0.42, as | 0.50, as |

TABLE 10

| Example Number | 44 | | 45 | | 46 | |
|---|---|---|---|---|---|---|
| Epoxy Resin from Ex. No. | 22 | | 20 | | 21 | |
| Curing agent | Polypox ™ H015 | | Epikure ™ 3140 | | Epikure ™ 3140 | |
| Mix Ratio | 100:14.1 | | 100:32.9 | | 100:17.4 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 2.28, ftr | 2.65, ftr | 2.71, ftr | 2.35, ftr | 2.16, ftr | 1.98, ftr |
| CoexPP (75SLP)/PE (GF-19) | 1.92, as | 1.73, as | 4.86, ftr | 3.97, ftr | 2.62, ftr | 2.85, ftr |
| PET/PE (GF-19) | 0.84, as | 1.07, as | 5.65, ftr | 5.82, ftr | 1.10, as | 1.23, as |
| Nylon/PE (GF-19) | 0.91, as | 0.72, as | 6.68, ftr | 5.39, ftr | 2.05, ftr | 2.72, ftr |
| PET-Met/PE (GF-19) | 0.61, as | 0.42, as | 3.67, ftr | 4.12, ftr | 1.01, as | 0.82, as |
| OPP-Met/PE (GF-19) | 1.90, as | 1.62, as | 4.02, ftr | 7.98, ftr | 2.99, ftr | 2.85, ftr |
| OPP-Met/CoexPP (70SPW) | 1.18, as | 1.21, as | 3.98, ftr | 2.75, ftr | 2.22, ftr | 1.33, ftr |
| Backed Foil/Nylon | 0.30, as | 0.19, as | 0.93, as | 0.25, as | 0.00, as | 0.00, as |
| Backed Foil/PET (92LBT) | 0.25, as | 0.14, as | 0.58, as | 1.44, as | 0.00, as | 0.00, as |
| Backed Foil/PE (GF-19) | 0.25, as | 0.22, as | 2.66, as | 1.57, ftr | 0.67, as | 0.59, as |

TABLE 11

| Example Number | 47 | | 48 | | 49 | |
|---|---|---|---|---|---|---|
| Epoxy Resin from Ex. No. | 22 | | 15 | | 15 | |
| Curing agent | Epikure ™ 3140 | | Example 24 | | Polypox ™ P370 | |
| Mix Ratio | 100:17.8 | | 100:40.0 | | 100:17.5 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 2.25, ftr | 1.87, ftr | 2.73, ftr | 2.08, ftr | 1.19, as | 1.83, ftr |
| CoexPP (75SLP)/PE (GF-19) | 2.69, ftr | 2.07, ftr | 6.79, ftr | 6.88, ftr | 2.11, as | 3.10, ftr |
| PET/PE (GF-19) | 1.07, as | 1.23, as | 2.07, as | 1.54, as | 1.43, as | 1.32, as |
| Nylon/PE (GF-19) | 1.26, as | 1.43, as | 3.14, ftr | 1.68, as | 1.56, as | 2.10, ftr |
| PET-Met/PE (GF-19) | 0.75, as | 1.28, as | 4.68, ftr | 5.04, ftr | 0.93, as | 0.94, as |
| OPP-Met/PE (GF-19) | 2.89, ftr | 3.53, ftr | 3.96, as | 4.37, as | 1.92, as | 2.01, as |
| OPP-Met/CoexPP (70SPW) | 1.61, ftr | 2.50, ftr | 3.29, ftr | 3.35, ftr | 1.45, as | 1.77, as |
| Backed Foil/Nylon | 0.00, as | 0.00, as | 0.44, as | 0.30, as | 0.00, as | 0.00, as |
| Backed Foil/PET (92LBT) | 0.00, as | 0.00, as | 0.39, as | 0.41, as | 0.00, as | 0.00, as |
| Backed Foil/PE (GF-19) | 0.72, as | 0.71, as | 1.72, as | 1.90, as | 0.93, as | 1.04, as |

TABLE 12

| Example Number | 50 | | 51 | | 52 | |
|---|---|---|---|---|---|---|
| Epoxy Resin from Ex. No. | 23 | | 12 | | 12 | |
| Curing agent | Example 25 | | Priamine ™ 1071 | | Jeffamine ™ D400 | |
| Mix Ratio | 100:47.6 | | 100:60.4 | | 100:35.8 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 2.31, ftr | 2.76, ftr | 1.66, ft | 1.49, ft | 2.09, ft | 1.38, ft |
| CoexPP (75SLP)/PE (GF-19) | 4.70, ftr | 3.80, ftr | 1.70, ft | 1.79, ft | 3.36, ft | 2.66, ft |
| PET/PE (GF-19) | 2.65, as | 2.01, as | 2.83, as | 2.05, as | 2.51, as | 2.53, as |
| Nylon/PE (GF-19) | 1.72, as | 1.84, as | 2.76, as | 2.76, ft | 2.47, as | 4.73, ft |
| PET-Met/PE (GF-19) | 0.63, as | 0.35, as | 0.00, as | 0.00, as | 0.00, as | 0.73, as |
| OPP-Met/PE (GF-19) | 0.73, as | 0.59, as | 0.32, as | 0.50, as | 0.82, as | 0.65, as |
| OPP-Met/CoexPP (70SPW) | 0.60, as | 0.78, as | 0.39, as | 0.66, as | 0.79, as | 0.63, as |
| Backed Foil/Nylon | 0.93, as | 1.08, as | 0.29, as | 0.78, as | 0.44, as | 0.58, as |
| Backed Foil/PET (92LBT) | 0.70, as | 0.67, as | 0.25, as | 0.12, as | 0.55, as | 0.92, as |
| Backed Foil/PE (GF-19) | 1.20, as | 1.29, as | 1.09, as | 1.18, as | 0.68, as | 0.95, as |

The invention claimed is:
1. An epoxy terminated polyester having the structure

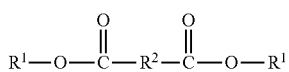

wherein R¹— is

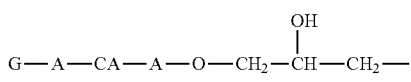

G- is

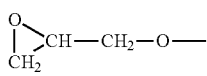

-A- is a divalent alkyl group, —CA- is a divalent cycloalkyl group, and —R²— is

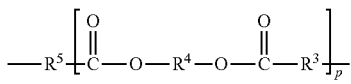

wherein said —R⁴— is a divalent organic group, and wherein said p is 0 to 20, and wherein said —R³— and —R⁵— is each independently selected from the group consisting of aliphatic groups having 12 or fewer carbon atoms and aromatic groups.

2. The polyester of claim 1, wherein said -A- is —(CH$_2$)$_n$— wherein n is 1 to 6.

3. The polyester of claim 1, wherein said —CA- is

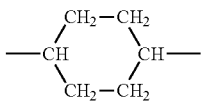

4. The polyester of claim 1, wherein said —R³— is either —(CH$_2$)$_q$— or

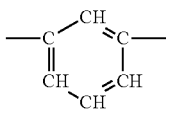

wherein q is 1 to 8.

5. The polyester of claim 1, wherein said —R⁴— is either —CH$_2$—CH$_2$— or —CH$_2$—CH$_2$—O—CH$_2$—CH$_2$—.

* * * * *